United States Patent [19]

Ohkoshi

[11] Patent Number: 4,776,008
[45] Date of Patent: Oct. 4, 1988

[54] KEY-IN SOUND-GENERATING CIRCUIT

[75] Inventor: Atsushi Ohkoshi, Yokohama, Japan

[73] Assignee: Kabushiki Kaisha Toshiba, Kawasaki, Japan

[21] Appl. No.: 34,923

[22] Filed: Apr. 6, 1987

[30] Foreign Application Priority Data

Sep. 30, 1986 [JP] Japan ................. 61-231881

[51] Int. Cl.⁴ .......................................... H04M 1/26
[52] U.S. Cl. .................... 379/350; 379/395; 379/362; 379/418
[58] Field of Search ............... 379/97, 355, 359, 361, 379/368, 418, 201, 257, 165; 340/365 E

[56] References Cited

U.S. PATENT DOCUMENTS

| | | | |
|---|---|---|---|
| 4,042,790 | 8/1977 | Richards | 379/283 X |
| 4,227,055 | 10/1980 | Hanson | 379/283 X |
| 4,399,535 | 8/1983 | Southand | 379/361 X |
| 4,496,799 | 1/1985 | Kingen et al. | 379/361 X |
| 4,497,980 | 2/1985 | Gorman et al. | 379/373 |
| 4,503,291 | 3/1985 | von Holten et al. | 379/355 |
| 4,528,681 | 7/1985 | Fulcomer, Jr. | 379/361 X |
| 4,571,723 | 2/1986 | Lusignan et al. | 379/361 X |
| 4,669,110 | 5/1987 | Daie et al. | 379/361 X |

Primary Examiner—James L. Dwyer
Attorney, Agent, or Firm—Finnegan, Henderson, Farabow, Garrett & Dunner

[57] ABSTRACT

A key-in sound-generating circuit comprises a keyboard including dial number keys and function keys, a DTMF signal generator coupled, at the output terminal, with a telephone network, a sound generator for converting, into a sound, the output signal from the DTMF signal generator, and a data processor circuit for executing the key data processing according to the keying operation performed using the keyboard, and supplying a control signal to the DTMF signal generator, the data processor being responsive to the operation of the dial number key, to supply a DTMF signal to the keyboard and the sound generator, and responsive to the operation of the function key, to supply a single-frequency signal to the keyboard and the sound generator.

4 Claims, 3 Drawing Sheets

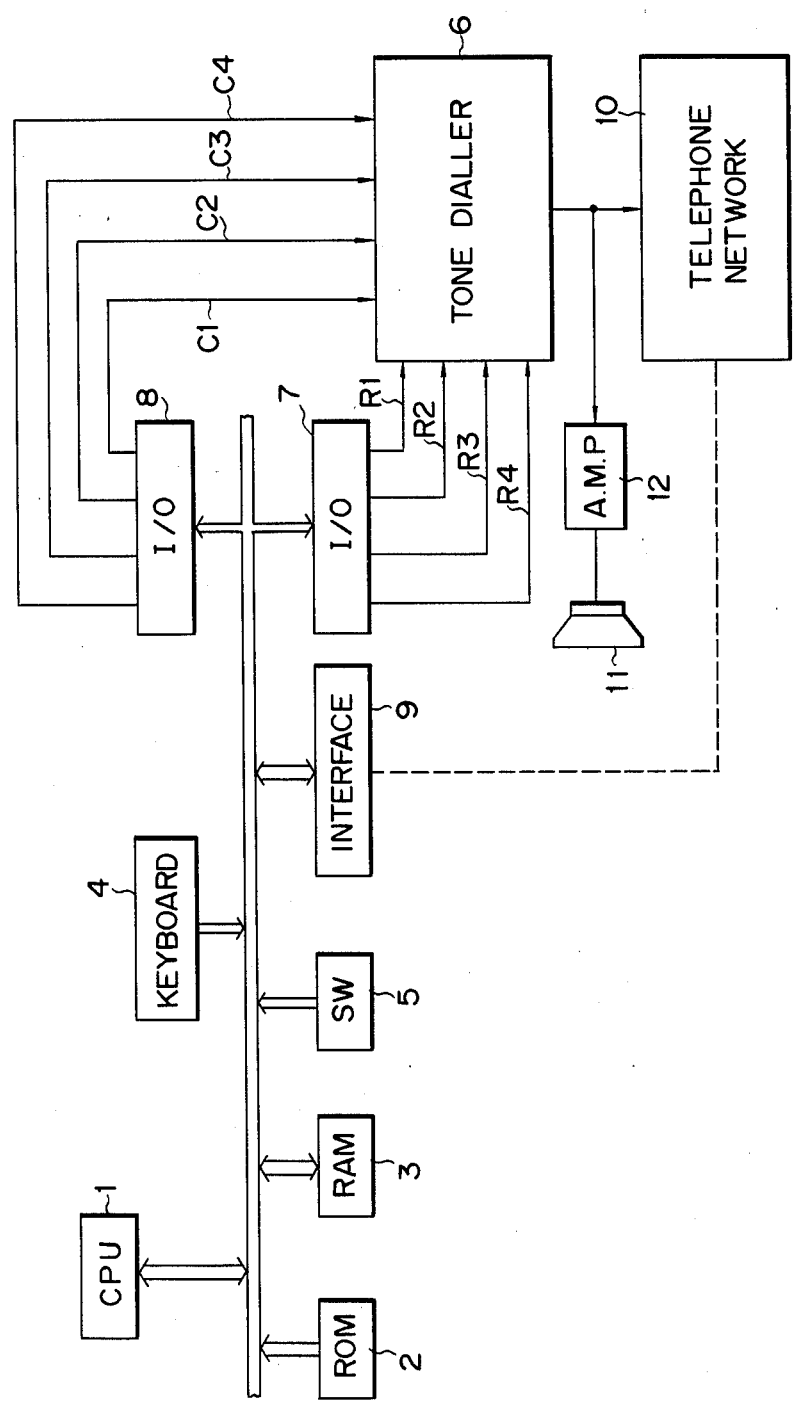
F I G. 2

KEY-IN SOUND-GENERATING CIRCUIT

BACKGROUND OF THE INVENTION

This invention relates to a key-in sound-generating circuit for use in a multifunction telephone set capable of storing data according to the key-in operation.

A tone dial telephone set is usually provided with a keyboard containing dial keys DK and function keys FK, as is shown in FIG. 1. A dual tone multifrequency (DTMF) is assigned to each of these dial keys (DK). Each of the dial tone multifrequencies is formed by mixing a low-frequency signal at a low group frequency of 697 Hz, 720 Hz, 852 Hz, or 941 Hz, and a high-frequency signal at a high group frequency of 1209 Hz, 1336 Hz, 1447 Hz, or 1633 Hz. Function keys FK include re-dial key RK for calling a number dialed just before, and memory keys MK for calling numbers previously registered. This type of multifunction telephone set comprises a memory, a DTMF signal-generating circuit (tone dialer), and a microcomputer consisting of one chip, for example. The memory stores the key data input by operating various types of keys. The microcomputer stores into the memory key data input by operating keys on the keyboard. The microcomputer drives the DTMF signal-generating circuit in response to the operation of dial key DK, and causes it to produce a DTMF signal. The tone dialer produces a signal at a single frequency when receiving a predetermined test input signal. With this, the tone dialer produces a DTMF signal in response to the key data input from the microcomputer. Additionally, the tone dialer can check individual low and high group frequencies when newly-manufactured telephone sets are inspected. The output signal from the tone dialer, i.e. the single-frequency signal, when the tone dialer receives the test input, or the DTMF signal generated by the normal dial key operation, is output to the telephone network. This signal is also supplied to the receiver of the telephone set, to produce the sound corresponding to each frequency.

In the multifunction telephone set, no key-in sound is produced when those keys other than the dial keys, that is, the function keys such as re-dial keys and abbreviated dial key are operated. Also no key-in sound is produced when the dial key is operated for dial number registration. Thus, in such a case, the user cannot know if the key-in was properly performed. To eliminate this problem, a frequency-dividing circuit is provided inside or outside the microcomputer. The signal obtained by frequency-dividing the clock signal by means of the frequency divider, is used to produce the key-in sound, even when the special key is operated. Provision of the frequency divider dedicated for key-in sound generation, however, inevitably leads to an increase in the cost and size of the telephone sets.

SUMMARY OF THE INVENTION

Accordingly, an object of this invention is to provide a key-in sound-generating circuit for telephone sets, which can produce a key-in sound at a single frequency when the special key is operated without using the frequency-dividing circuit exclusively for the key-in sound generation.

To achieve the above object, a key-in sound-generating circuit is provided, comprising a keyboard including dial number keys and function keys, a DTMF signal generator coupled, at the output terminal, with a telephone network, a sound generator for converting the output signal from the DTMF signal generator into a sound, and a data processor circuit for executing the key data processing according to the keying operation performed using the keyboard, and supplying a control signal to the DTMF signal generator, the data processor being responsive to the operation of the dial number key, to supply a DTMF signal to the keyboard and the sound generator, and responsive to the operation of the function key, to supply a single-frequency signal to the keyboard and the sound generator.

With such an arrangement, in a dial tone mode, a single-frequency signal can be produced in response to the operation of the function key, thereby enabling the user to check that the function key is properly operated. In a pulse dial tone mode, a single-frequency signal is produced in response to the dial number key. This enables the user to easily confirm the proper operation of the dial pulse key.

BRIEF DESCRIPTION OF THE DRAWINGS

FIG. 2 shows a block diagram of a tone dial telephone set including a key-in sound-generating circuit according to an embodiment of this invention;

FIGS. 3A to 3G are waveforms to aid in explaining the operation of the circuit shown in FIG. 2.

DETAILED DESCRIPTION OF THE PREFERRED EMBODIMENT

Figure 1:
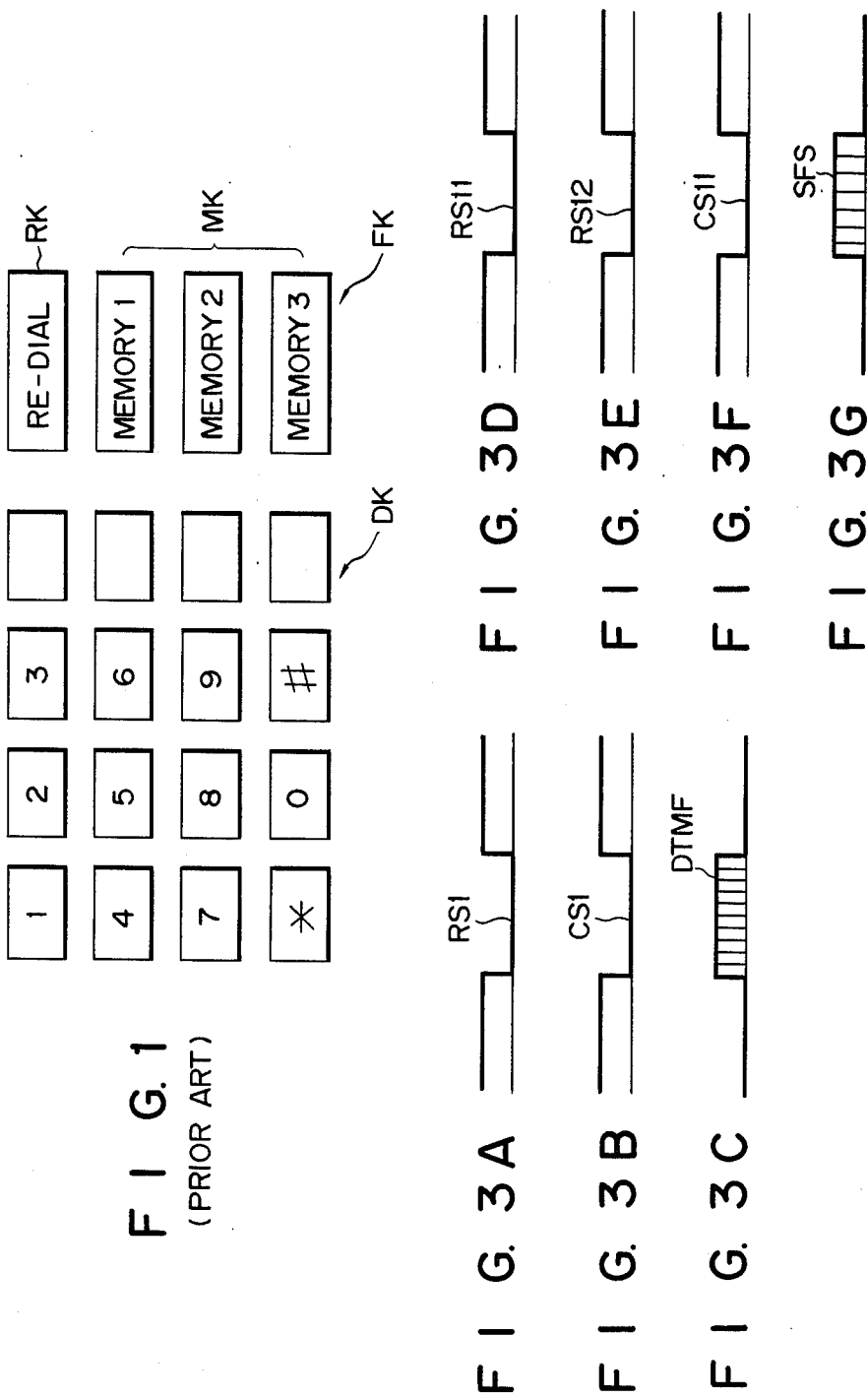
FIG. 1 shows a layout of a keyboard of a conventional tone dial telephone set.

FIG. 2 shows an embodiment of the present invention, which is a tone dial telephone set being selectively connectable to a tone dial telephone network or a pulse dial telephone network. The embodiment contains a key-in sound-generating circuit. The speech circuit is not essential to this invention, and will therefore not be described. The telephone set comprises central processing unit (CPU) 1, ROM 2, RAM 3, keyboard 4, and select switch 5. ROM 2 stores the program for controlling the operation of CPU 1. RAM 3 stores the data processed by CPU 1. Select switch 5 selects either the pulse dial or tone dial mode. CPU 1, ROM 2, and RAM 3 are contained in a one-chip microcomputer. CPU 1 is connected to DTMF signal generator (tone dialer) 6 via I/O port 7 and row signal line R1 to R4, and via I/O port 8 and column signal lines C1 to C4. CPU 1 is also connected to interface 9. The output terminal of tone dialer 6 is connected to pulse dial or tone dial telephone network 10, and is also connected to speaker 11 via amplifier 12. Keyboard 4 comprises dial number keys DK, and function keys FK including re-dial and memory keys RK and MK, as in the case of FIG. 1. If telephone network 10 is of tone dial type, tone dialer 6 is connected to telephone network 10, and select switch 5 is set to a first switching position. In the case of the pulse dial telephone network, interface 9 is connected to telephone network 10, and select switch 5 is set to a second switching position.

CPU 1 stores key data in RAM 3 and/or supplies it to tone dialer 6, in response to a keying operation performed using keyboard 4, under the control of the program stored in ROM 2. For example, if one of dial number keys DK is operated, CPU 1 stores, in RAM 3, the key data corresponding to the key operated. At the same time, CPU 1 supplies to tone dialer 6, row and column signals RS1 and CS1, respectively representing row and column addresses, via I/O ports 7 and 8. These row and column signals RS1 and CS1 are set to be low-level, as is shown in FIGS. 3A and 3B. In this case, other row and column signals are kept high. Tone dialer 6 generates a DTMF signal corresponding to a combination of frequencies designated by row and column signals of low level thus input, as is shown in FIG. 3C. If a key other than dial number keys DK (that is, one of function keys FK) is operated, CPU 1 executes key data processing according to the keying operation, and supplies to tone dialer 6, two row signals RS11 and RS12 of low level, and one column signal CS11 of low level, as is shown in FIGS. 3D to 3F. These signals RS11 and RS12, and CS11 respectively represent two row addresses and one column address which have been assigned to the operated function key FK. Upon receipt of these two low-level signals and one low-level column signal, tone dialer 6 generates a signal SFS of a single frequency, which is designated by the input row and column signals, and selected from low and high frequencies, as shown in FIG. 3G.

Figure 4:
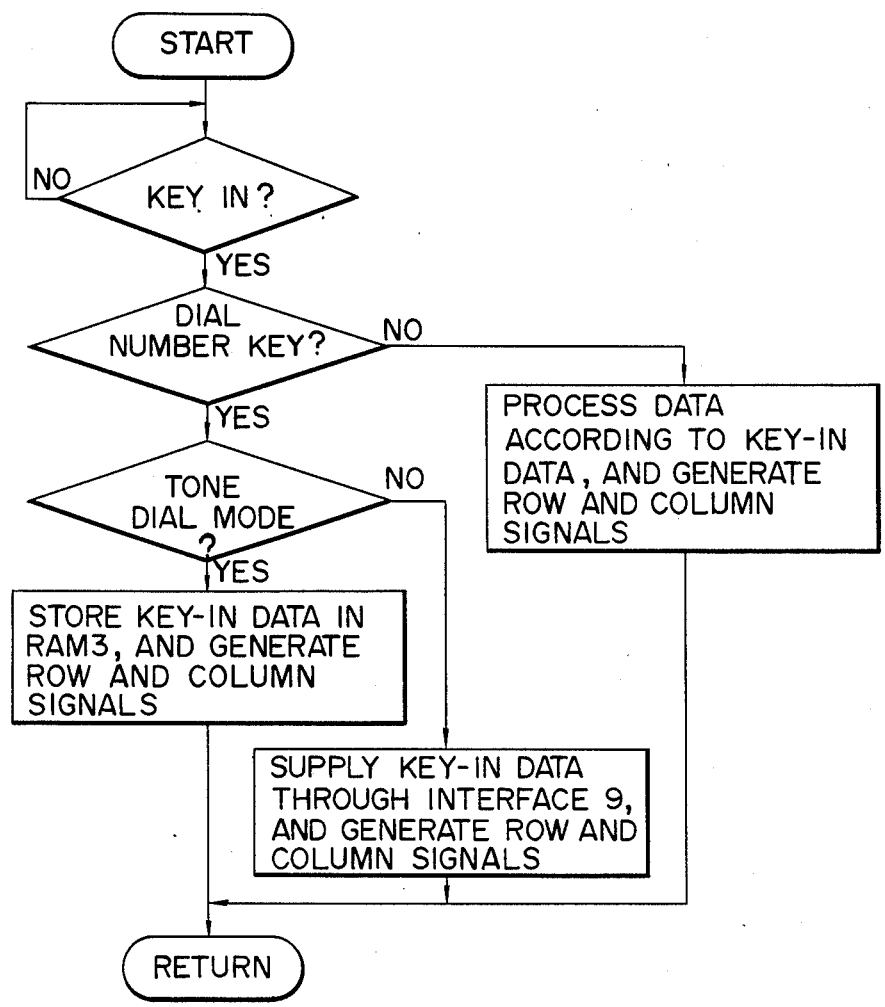
FIG. 4 shows a flowchart for explaining the operation of the circuit of FIG. 2.

The operation of the key-in sound-generating circuit shown in FIG. 2 will now be described, with reference to a flowchart stored in ROM 2, as illustrated in FIG. 4.

When a key on keyboard 4 is operated, CPU 1 checks whether or not the operated key is a dial number key. If it detects that a dial number key has been operated, CPU 1 supplies to tone dialer 6, a corresponding control signal including four row signals and four column signals. For example, if dial number key 1 is operated, data "1" is stored in RAM 3. In this case, row signal (RS1) on first row signal line R1 is activated or set at low level, and the row signals on second to fourth row signal lines R2 to R4 are set at high level. Only column signal (CS1) on first column signal line C1 is activated or set at low level, with column signal lines C2 to C4 are set high. If one of function keys FK (for example, the re-dial key) is operated, dial number data is read out from RAM 3. Row signals (RS11 and RS12) on the first and second row signal lines, for example, are set at low level, and those on third and fourth row signal lines R3 and R4 are set high. At the same time, column signal (CS11) on first column signal line C1 becomes low and those on second to fourth column signal lines C2 to C4 become high.

If select switch 5 is set to the first switching position, CPU 1 supplies to tone dialer 6, row and column signals corresponding to a keying operation. Tone dialer 6 generates a DTMF signal (FIG. 3C) in response to the row and column signals supplied from CPU 1, when dial number "1", for example is operated. The DTMF signal is a combination of a 697 Hz signal of the low-frequency group and a 1209 Hz signal of the high-frequency group. The DTMF signal is supplied to the telephone network, as dial number data, and also to the receiver, as a key input sound signal. As a result, speaker 11 of the receiver issues a sound corresponding to the DTMF signal. If the re-dial key is operated, tone dialer 6 generates a signal at a single frequency, 1209 Hz, for example, and activates speaker 11.

If select switch 5 is set to the second switching position, CPU 1 supplies to tone dialer 6, predetermined row and column signals corresponding to a keying operation. The single-frequency signal from tone dialer 6 activates speaker 11. CPU 1 further supplies to telephone circuit 10 via interface 9, the pulse dial key data corresponding to the keying operation.

If select switch 5 is set to the first switching position, and the tone dial telephone network is used, the key-in sound issued from speaker 11 by the DTMF signal indicates that a dial number key has been operated. The key-input sound at a single frequency indicates that a function key has been operated. If select switch 5 is set to the second switching position, and the pulse dial telephone network is used, speaker 11 issues a key-in sound at a single frequency, in response to the dial key operation.

As has been described above, in the embodiment, the key-in sound can be produced by controlling the tone dialer contained in the telephone set, without the need to use a special key-in sound signal generator.

While this invention has been described using one specific embodiment, it is evident that the invention is not limited to the specific embodiment. For example, when a specific function key is operated, it is possible to prohibit key-in sound generation. Further, when the function key is operated, it can produce a signal in the form of a combination of one row signal and two column signals. Further, select switch 5 and interface 9 can be omitted.

What is claimed is:

1. A key-in sound generating circuit comprising:
   keyboard means including dial number keys for generating dial number key data and function keys for generating function key data;
   data processing means having memory means for storing a control signal;
   DTMF signal-generating means for receiving the control signal and having an output terminal for delivering in response to the control signal a DTMF output signal and a single-frequency signal;
   means for reading out the control signal from the memory means to the DTMF signal generating means in response to said function key data;
   sound-generating means connected to the output terminal of said DTMF signal-generating means for selectively generating a DTMF sound and a single-frequency sound in response to said DTMF signal and said single-frequency signal, respectively; and
   means for supplying the read-out control signal to said DTMF signal generating means to generate a single frequency sound from said sound generating means.

2. A key-in sound-generating circuit according to claim 1, wherein said sound-generating means includes an amplifier for amplifying the output signal from said DTMF signal-generating means, and generates a sound in response to the output signal from said amplifier.

3. A key-in sound-generating circuit according claim 2, further comprising a mode-select switch for selecting a pulse dial mode or a tone dial mode, and wherein said data-processing means responds to a key-in signal from said keyboard means, to supply a control signal to said DTMF signal-generating means, when said mode-select switch is set to a pulse dial mode position.

4. A key-in sound-generating circuit according to claim 1, further comprising a mode-select switch for selecting a pulse dial mode or a tone dial mode, and wherein said data-processing means responds to a key-in signal from said keyboard means, to supply a control signal to said DTMF signal-generating means, when said mode-select switch is set to a tone dial mode position.

* * * * *